(12) United States Patent
Fukamachi et al.

(10) Patent No.: US 9,361,557 B2
(45) Date of Patent: Jun. 7, 2016

(54) IMAGE PROCESSING APPARATUS AND CONTROL METHOD FOR PERFORMING SCREEN PROCESSING

(71) Applicant: CANON KABUSHIKI KAISHA, Tokyo (JP)

(72) Inventors: Hitoshi Fukamachi, Kawasaki (JP); Hideki Kubo, Kawasaki (JP); Atsushi Ushiroda, Kawasaki (JP)

(73) Assignee: CANON KABUSHIKI KAISHA, Toyo (JP)

( * ) Notice: Subject to any disclaimer, the term of this patent is extended or adjusted under 35 U.S.C. 154(b) by 0 days.

(21) Appl. No.: 14/177,400

(22) Filed: Feb. 11, 2014

(65) Prior Publication Data

US 2014/0160533 A1 Jun. 12, 2014

Related U.S. Application Data

(63) Continuation of application No. 12/236,185, filed on Sep. 23, 2008, now Pat. No. 8,687,240.

(30) Foreign Application Priority Data

Oct. 16, 2007 (JP) ................................. 2007-269528

(51) Int. Cl.
*G06K 15/00* (2006.01)
*G06K 15/02* (2006.01)
*H04N 1/405* (2006.01)
*H04N 1/409* (2006.01)

(52) U.S. Cl.
CPC ............ *G06K 15/1881* (2013.01); *H04N 1/405* (2013.01); *H04N 1/4092* (2013.01)

(58) Field of Classification Search
None
See application file for complete search history.

(56) References Cited

U.S. PATENT DOCUMENTS

| 5,268,774 | A | * | 12/1993 | Eschbach | ............. | H04N 1/4053 |
| | | | | | | 358/445 |
| 7,139,101 | B2 | * | 11/2006 | Loce et al. | ................... | 358/3.06 |
| 7,460,272 | B2 | * | 12/2008 | Hara | ..................... | H04N 1/405 |
| | | | | | | 358/1.9 |
| 2005/0219634 | A1 | * | 10/2005 | Murakami | ................... | 358/3.28 |

* cited by examiner

*Primary Examiner* — Steven Kau
(74) *Attorney, Agent, or Firm* — Cowan, Liebowitz & Latman, P.C.

(57) ABSTRACT

This invention obtains a high-quality output image in which a jaggy or a disconnection of a thin line hardly stands out. An edge detection unit detects whether the pixel of interest is an edge pixel or a non-edge pixel. A screen processing unit performs screen processing for the pixel of interest to determine the output value of the N-level tone. A calculation unit performs filtering processing having a preset visual sense characteristic for an area including the pixel of interest to calculate the target value of the pixel of interest, and corrects the value of the pixel of interest so as to come close to the target value, thereby determining the output value of the N-level tone. The selector selects, according to the detection result by the edge detection unit, either the result from the calculation unit or that from the screen processing unit.

17 Claims, 14 Drawing Sheets

FIG. 5

NEIGHBORING PIXELS (3×3)

EDGE DETECTION FILTER (3×3)

$$E = \begin{vmatrix} A00 & A10 & A20 \\ A01 & A & A21 \\ A02 & A12 & A22 \end{vmatrix} * \begin{vmatrix} -1 & -1 & -1 \\ -1 & 8 & -1 \\ -1 & -1 & -1 \end{vmatrix}$$

PIXEL OF INTEREST

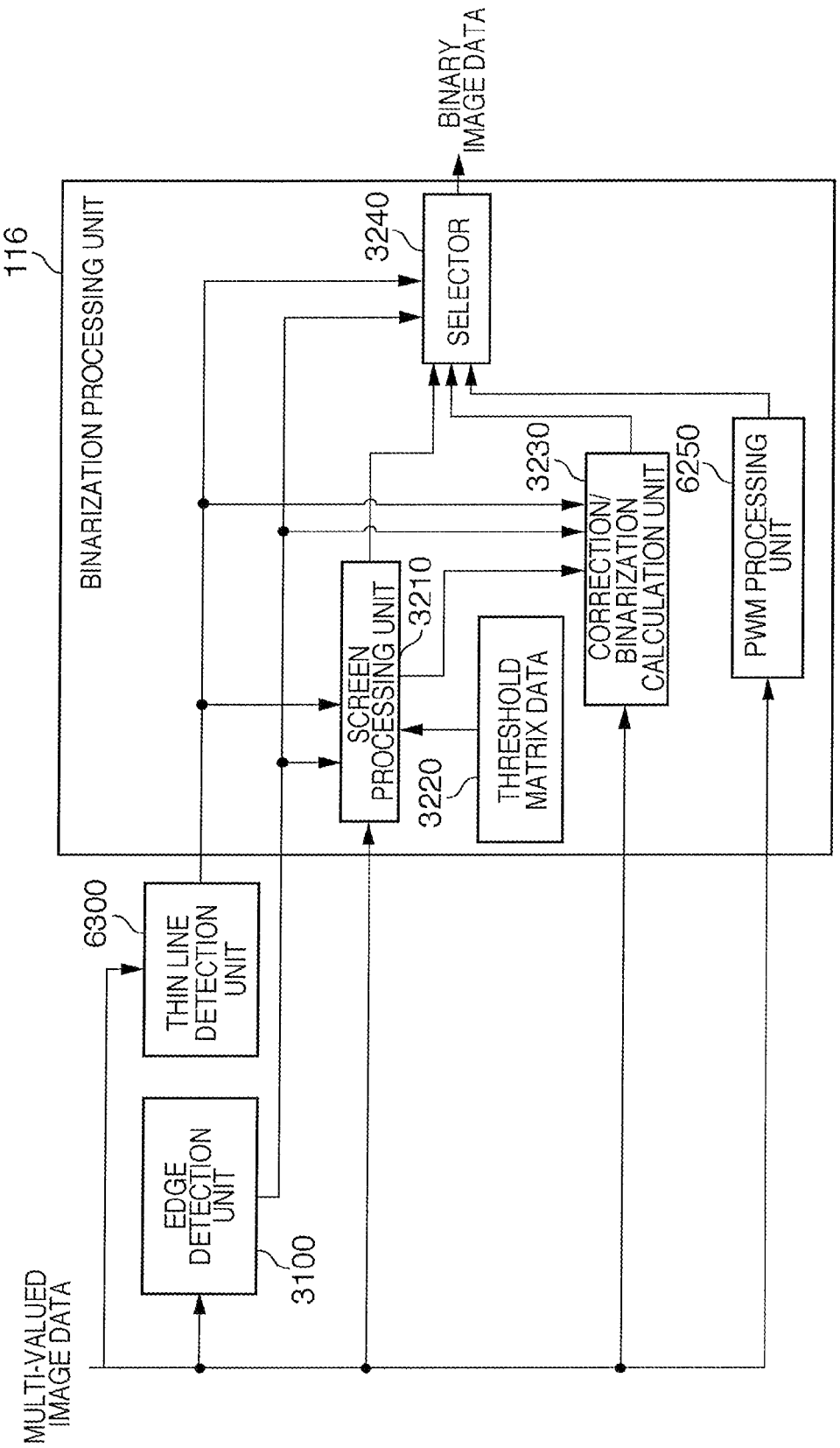

FIG. 9A

THIN LINE DETECTION FILTER
(VERTICAL)

| -1 | 0 | 2 | 0 | -1 |
|----|---|---|---|----|
| -1 | 0 | 2 | 0 | -1 |
| -1 | 0 | 2 | 0 | -1 |
| -1 | 0 | 2 | 0 | -1 |
| -1 | 0 | 2 | 0 | -1 |

FIG. 10

| EDGE DETERMINATION RESULT | THIN LINE DETERMINATION RESULT | BINARIZATION PROCESSING CONTENTS |
|---|---|---|
| NOT EDGE | NOT THIN LINE | SCREEN PROCESSIN |
| EDGE | NOT THIN LINE | CORRECTION/BINARIZATION CALCULATION PROCESSING |
| NOT EDGE | THIN LINE | PWM PROCESSING |
| EDGE | THIN LINE | PWM PROCESSING |

FIG. 11
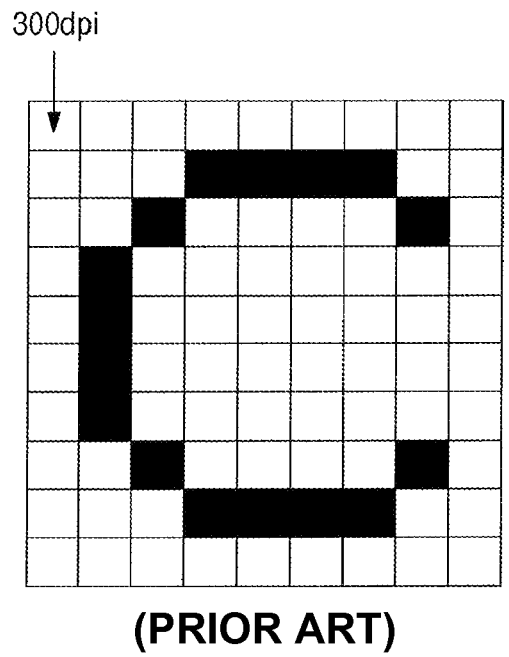
(PRIOR ART)
FIG. 12A          FIG. 12B
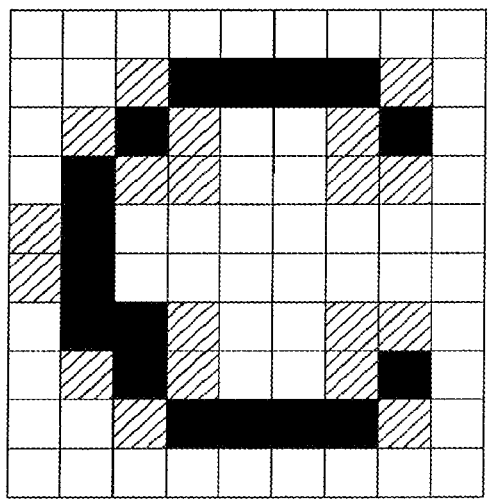      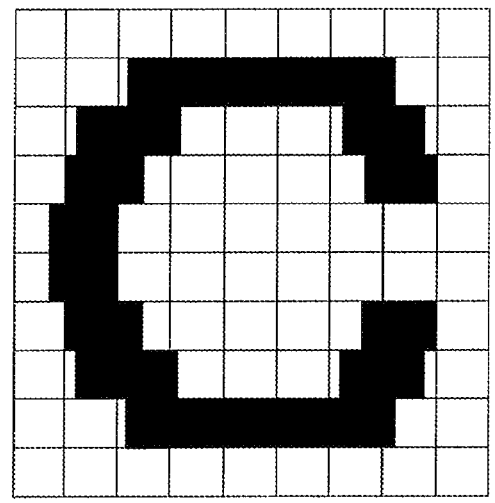
(PRIOR ART)       (PRIOR ART)

(PRIOR ART)

(PRIOR ART)

IMAGE PROCESSING APPARATUS AND CONTROL METHOD FOR PERFORMING SCREEN PROCESSING

CROSS-REFERENCE TO RELATED APPLICATIONS

This application is a continuation of application Ser. No. 12/236,185, filed Sep. 23, 2008 the entire disclosure of which is hereby incorporated by reference.

BACKGROUND OF THE INVENTION

1. Field of the Invention

The present invention relates to an image processing method and apparatus and, more particularly, to an image processing method and apparatus for performing pseudo-halftoning for multi-valued input data.

2. Description of the Related Art

A conventional image processing apparatus such as an electrophotographic printer generates a binary signal representing the ON/OFF state of a dot on print paper, i.e., whether or not to form a dot. The image processing apparatus prints an image in accordance with the binary signal. The tone of an image is expressed by the number of dots formed per unit area. Thus, binarization processing is generally called pseudo-halftoning.

Pseudo-halftoning which determines the ON/OFF state of a dot uses a halftone screen or halftone dot. Halftone screen processing in a digital image processing apparatus uses a two-dimensional threshold matrix to execute binarization processing for determining the ON/OFF state of a dot. More specifically, each threshold in the threshold matrix is compared with a corresponding pixel value of an input multi-valued image. A value equal to or larger than the threshold or a value smaller than it is expressed by a binary value (0 or 1).

There have conventionally been proposed several techniques for improving a jaggy generated in a low-resolution printer and the like. The jaggy is roughness (aliasing) of the edge portion of a character image or the like. FIG. 11 shows an example of the jaggy. FIG. 11 shows a plurality of squares, and each square corresponds to one pixel. FIG. 11 shows an example at 300 dpi. When the image resolution is as low as 300 dpi, as shown in FIG. 11, particularly an oblique edge portion is jagged.

A conventional technique improves such a jaggy by adding using pattern matching image data to a portion which matches a pattern, or removing a pixel causing the jaggy. Details of pattern matching are well known, so a detailed description thereof will be omitted. Japanese Patent Laid-Open No. 4-341060 discloses an example of a smoothing technique.

FIGS. 12A and 12B show examples of improving the jaggy. FIG. 12A shows an example of adding halftone data of low density represented by hatched portions in FIG. 12A to the peripheries of pixels matched by pattern matching. Halftone data is added to a portion where a jaggy occurs, visually suppressing generation of the jaggy.

FIG. 12B shows an example of further dividing pixels matched by pattern matching. Pixel division is a technique of dividing one pixel at 300 dpi in the above-mentioned example into a plurality of partial areas, and determining the ON/OFF state of a dot in each partial area. The pixel division technique is also well known (e.g., Japanese Patent Laid-Open No. 9-321986), and a detailed description thereof will be omitted.

However, these methods still leave the following problem unsolved.

When pseudo-halftoning, e.g., screen processing is done for a character image of low density (or low brightness), as shown in FIG. 13A, it may lead to a printed result as shown in FIG. 13B. That is, a low-density character image undergoes pseudo-halftoning at a screen resolution lower than the 300-dpi printer resolution. As a result, the character or thin line becomes disconnected. This is because the screen resolution is pseudo-represented at once for a plurality of pixels (dots) of the printer, so pseudo-halftoning is not executed using a screen resolution higher than the printer resolution. For example, a general screen resolution (screen ruling) in the printing industry is 85 to 175 lines, and about 268 lines at most. At a high LPI (Lines Per Inch) of 200 or more, an electrophotographic printer hardly obtains a stable image quality owing to mechanical characteristics. Owing to the relationship between the printer resolution and the screen ruling, a halftone character or thin line having undergone pseudo-halftoning becomes disconnected. Thus, smoothing processing by the above-described pattern matching cannot suppress a jaggy and disconnection, and there is still room for improvement.

FIG. 14 macroscopically shows part of a character image. As is apparent from FIG. 14, an undesirable jaggy sometimes appears at the edge portion of an image obtained by performing screen processing for a halftone image. In this way, a jaggy generated at low LPI in screen processing still remains unsolved.

SUMMARY OF THE INVENTION

The present invention has been made to overcome the conventional drawbacks, and has as its object to provide a technique of suppressing generation of a jaggy at the edge portion of an image obtained by performing screen processing for a halftone image, line image, or the like expressed at low density or the like.

To solve the conventional problem, an image processing apparatus according to the present invention comprises the following arrangement.

That is, the present invention provides an image processing apparatus which converts multi-valued image data represented by an M-level tone into image data of an N-level tone (N<M) reproducible by a printer engine, the apparatus comprising:

an edge detection unit which detects whether a pixel of interest in the multi-valued image data is an edge pixel;

a screen processing unit which, when the edge detection unit detects that the pixel of interest is a non-edge pixel, performs screen processing for the pixel of interest to determine an output value of the N-level tone; and a correction calculation unit which, when the edge detection unit detects that the pixel of interest is an edge pixel, performs filtering processing for an area including the pixel of interest using a first filter having a preset visual sense characteristic to calculate a target value of the pixel of interest, and corrects a value of the pixel of interest so as to come close to the target value, thereby determining an output value of the N-level tone.

According to the present invention, a high-quality output image in which a jaggy or a disconnection of a thin line hardly stands out can be obtained by converting image data of an M-level tone into that of an N-level tone reproducible by a printer engine.

Further features of the present invention will become apparent from the following description of exemplary embodiments with reference to the attached drawings.

BRIEF DESCRIPTION OF THE DRAWINGS

FIG. 5 is a view showing an example of an equation which calculates an edge amount from input multi-valued image data and an edge detection filter used in an edge detection unit in the embodiment;

FIG. 7 is a block diagram showing the arrangements of a binarization processing unit and its periphery in the second embodiment;

FIGS. 9A and 9B are views each showing a thin line detection filter used in a thin line detection unit in the second embodiment;

FIG. 10 is a table showing binarization processing contents corresponding to edge determination results together with thin line determination results in the second embodiment;

FIG. 11 is a view showing an example of a jaggy;

FIGS. 12A and 12B are views each showing an improvement of a jaggy by conventional smoothing processing;

DESCRIPTION OF THE EMBODIMENTS

Preferred embodiments in which image data of an M-level tone is converted into that of an N-level tone reproducible by a printer engine will be described in detail below with reference to the accompanying drawings.

First Embodiment

Figure 1:
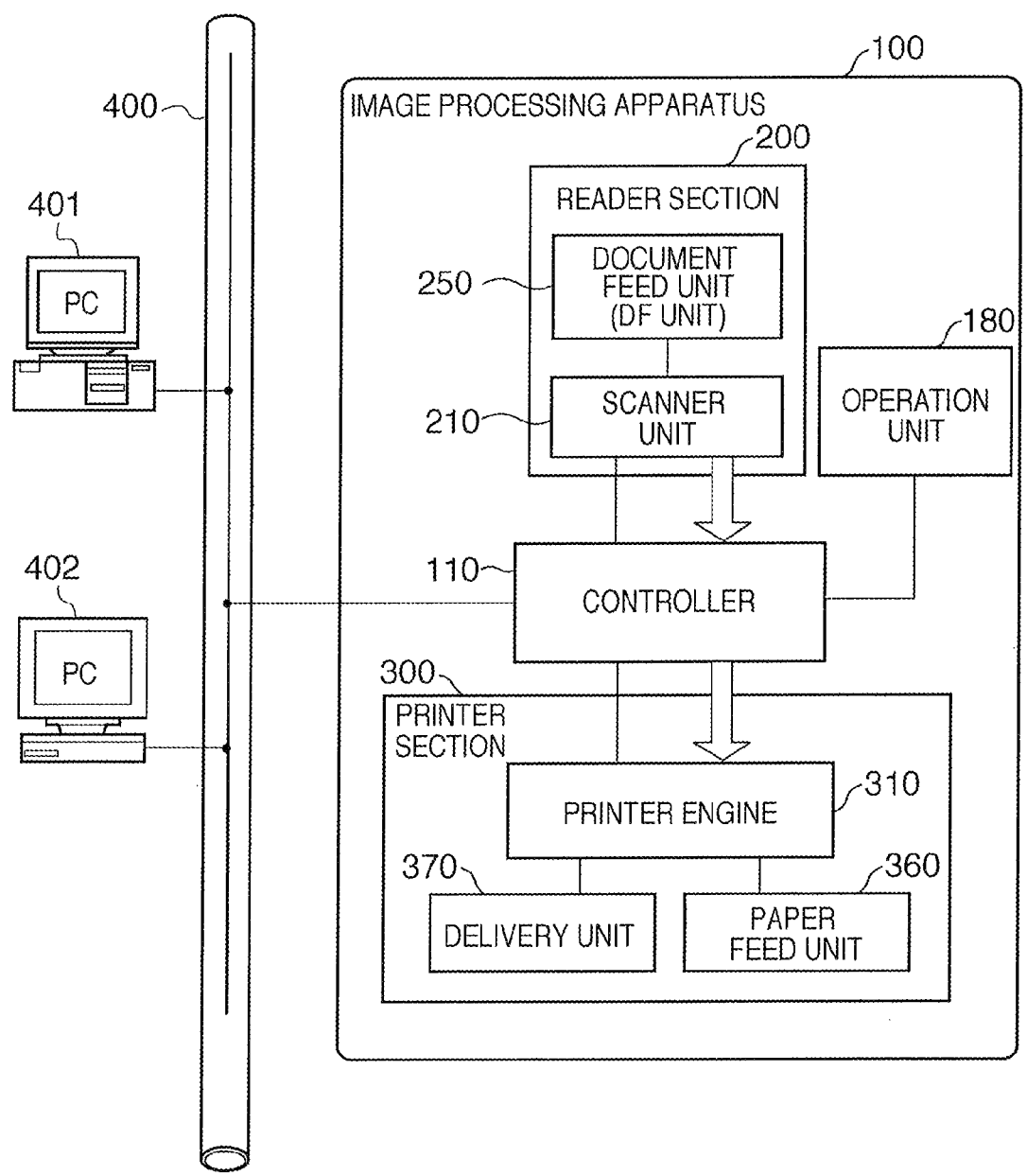
FIG. 1 is a view showing the schematic arrangement of an image processing apparatus in an embodiment.

FIG. 1 is a view showing the arrangement of an image processing apparatus (multi-functional peripheral), and a network system to which the image processing apparatus is connected in the first embodiment.

In FIG. 1, an image processing apparatus 100 comprises a reader section 200, printer section 300, controller 110, and operation unit 180. The reader section 200, printer section 300, and operation unit 180 are connected to the controller 110. The controller 110 is connected via a network 400 to external devices such as personal computers (to be simply referred to as PCs hereinafter) 401 and 402. As will be described later, the image processing apparatus 100 functions as a copying machine, network printer, and network scanner.

The operation unit 180 includes various switches, buttons, and a liquid crystal touch panel, and functions as a user interface for operating the image processing apparatus 100. The reader section 200 comprises a scanner unit 210 and document feed unit 250. The document feed unit 250 feeds a document to the scanner unit 210. The scanner unit 210 optically reads an image from the conveyed document, and converts the read analog image signal into digital image data.

The printer section 300 comprises a paper feed unit 360, printer engine 310, and delivery unit 370. The paper feed unit 360 has cassettes for holding a plurality of types of print media (print sheets), and conveys a print medium to the printer engine 310. The printer engine 310 prints by applying a printing material into a visible image on a print medium in accordance with image data (8 bits=256 tones in the first embodiment). The delivery unit 370 includes a sheet processing apparatus for performing post-processes such as sorting and stapling for printed transfer media. The delivery unit 370 delivers printed transfer media to outside the image processing apparatus 100. The printer engine 310 in the first embodiment is a laser beam printer engine, and prints based on a quantized density value of one pixel according to PWM (Pulse Width Modulation).

For example, the range of scanning exposure with a laser beam for one pixel is divided into N, and data is generated to represent the number of areas to be exposed among the N areas. Upon N division, one dot is represented by an (N+1)-level tone of 0 to N. In the first embodiment, processing to determine binary data (i.e., 0 or 1) representing whether or not to expose each of the N areas will be called binarization. In the first embodiment, N=4, i.e., the scanning exposure range of one pixel is divided into four for descriptive convenience.

When the image processing apparatus 100 functions as a copying machine (copy mode), the controller 110 controls the reader section 200 to read a document. The reader section 200 optically reads a document, and outputs an image signal obtained by reading to the controller 110. The controller 110 converts the image signal from the reader section 200 into digital image data (8 bits per pixel in the first embodiment), performs predetermined image processing, and outputs the resultant image data to the printer section 300. Based on the received image data, the printer section 300 forms an image on a print medium (print sheet), and discharges the print medium to outside the image processing apparatus 100. In this manner, the apparatus functions as a copying machine.

When the image processing apparatus 100 functions as a network scanner, image data received from the reader section 200 is converted into code data, and the code data is transmitted to the PC 401 or 402 serving as an external device via the network 400.

The user selects and determines, via the operation unit 180, either the copy mode or network scanner mode in which the image processing apparatus 100 operates.

The controller 110 also converts code data (print data) received from an external device via the network 400 into image data, and outputs the image data to the printer section 300. That is, the image processing apparatus 100 functions as a network printer. The network printer function is activated when the controller 110 receives print data from a network. When the printer section 300 runs in another mode upon receiving print data, the controller 110 temporarily stores the received data in a buffer memory (storage: not shown). After the printer section 300 becomes available, the controller 110 reads out the temporarily stored print data and performs print processing.

Figure 2:
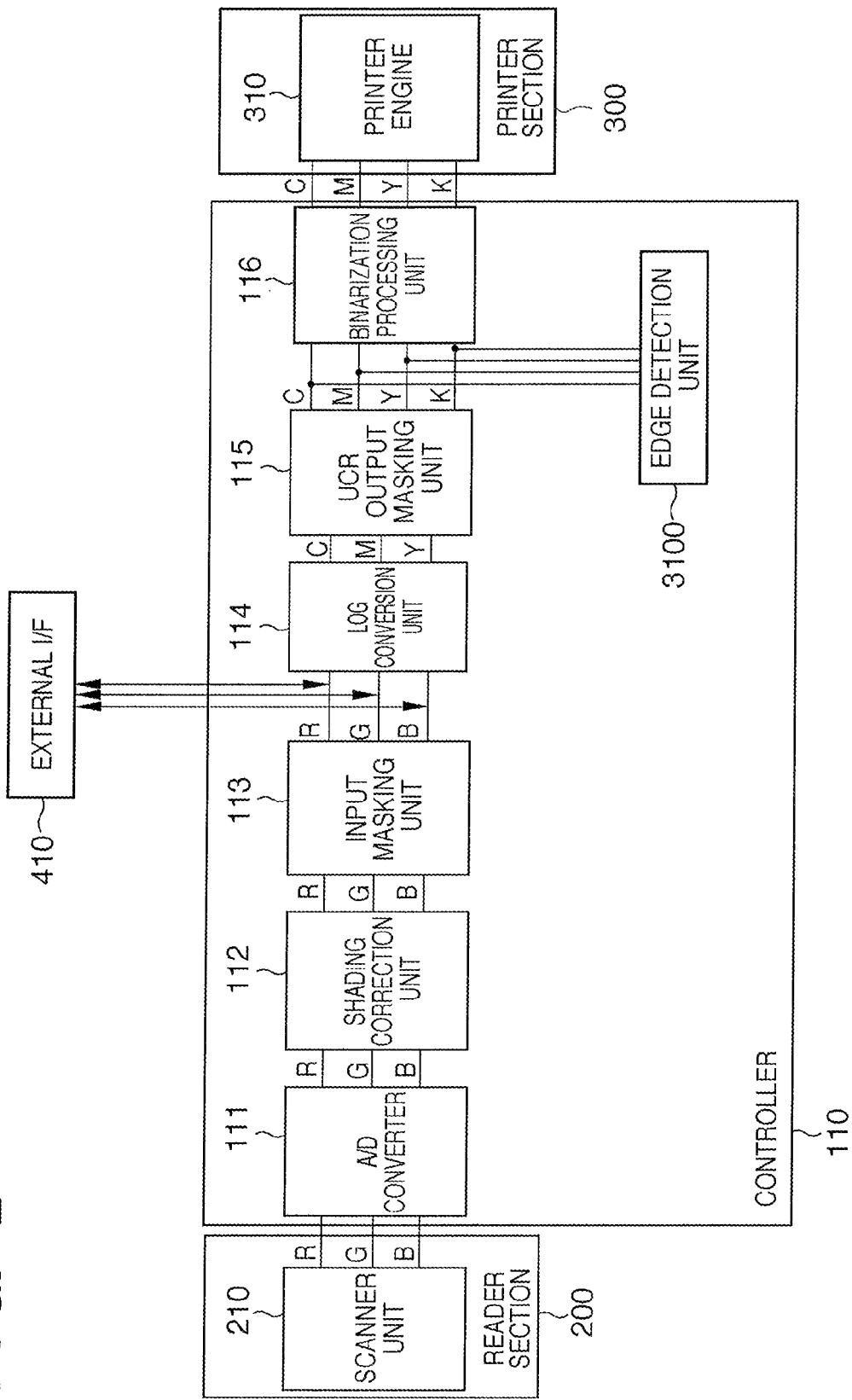
FIG. 2 is a block diagram showing the detailed arrangement of a controller in the embodiment.

FIG. 2 shows the detailed arrangement of the controller 110. In FIG. 2, the scanner unit 210 scans a document at, e.g., 300 dpi, and supplies R, G, and B read signal outputs to the controller 110. An A/D converter 111 in the controller 110 converts the R, G, and B input signal outputs into digital signals (image data). The A/D converter 111 in the first embodiment converts each of R, G, and B input analog signals into data of 8 bits (256 tones).

A shading correction unit 112 corrects image data in accordance with the illumination light quantity, the nonuniformity of light quantity on the light-receiving surface of the scanner unit 210 in the lens optical system, and the sensitivity nonuniformity of pixels in the scanner unit 210. An input masking unit 113 accurately corrects the color appearances of the R, G, and B read signals by RGB matrix calculation.

The input masking unit 113 outputs the corrected image data to an external I/F 410 or LOG conversion unit 114. The controller 110 determines which of the external I/F 410 and LOG conversion unit 114 is to receive corrected image data.

The external I/F 410 is connected to a circuit which converts image data into a code, a network interface which transmits image data to a network, and a circuit which generates image data from print data received from a network.

When the apparatus functions as a network scanner, image data corrected by the input masking unit 113 is output to the external I/F 410. Then, processing to convert the image data into a code, and processing to transmit the code data to a PC on the network 400 via a network interface are done.

In the copy mode, image data corrected by the input masking unit 113 is output to the LOG conversion unit 114. When the apparatus functions as a network printer, image data as a result of rendering based on print data is supplied from the external I/F 410 to the LOG conversion unit 114.

The LOG conversion unit 114 converts R, G, and B color component data into C (Cyan), M (Magenta), and Y (Yellow) density data serving as print color components. A UCR•output masking unit 115 performs UCR (Under Color Removal) for C, M, and Y input data, and internally generates C, M, Y, and K (blacK) data (8 bits each). The UCR•output masking unit 115 executes matrix calculation for the internally generated C, M, Y, and K data in order to correct the color reproducibility of the printer section 300, and outputs the calculation result to a binarization processing unit 116 and edge detection unit 3100. Details of the edge detection unit 3100 will be described later.

The binarization processing unit 116 binarizes the C, M, Y, and K input image data, and outputs the binarization results (PWM signals) to the printer engine 310 in the printer section 300.

The printer engine 310 in the first embodiment prints by sequentially superposing images of C, M, Y, and K print color components onto one print sheet. In other words, the above-described processing for forming image data of one print color component is executed a total of four times. Every time this processing is done, the UCR•output masking unit 115 outputs one of C, M, Y, and K color component data in order. Hence, the binarization processing unit 116 and edge detection unit 3100 suffice to process data of one color component.

To the contrary, when the printer section 300 simultaneously prints images of a plurality of color components, the binarization processing unit 116 and edge detection unit 3100 suffice to comprise the following arrangement for the number of color components.

The edge detection unit 3100 and binarization processing unit 116 in the controller 110 will be explained in more detail.

Figure 3:
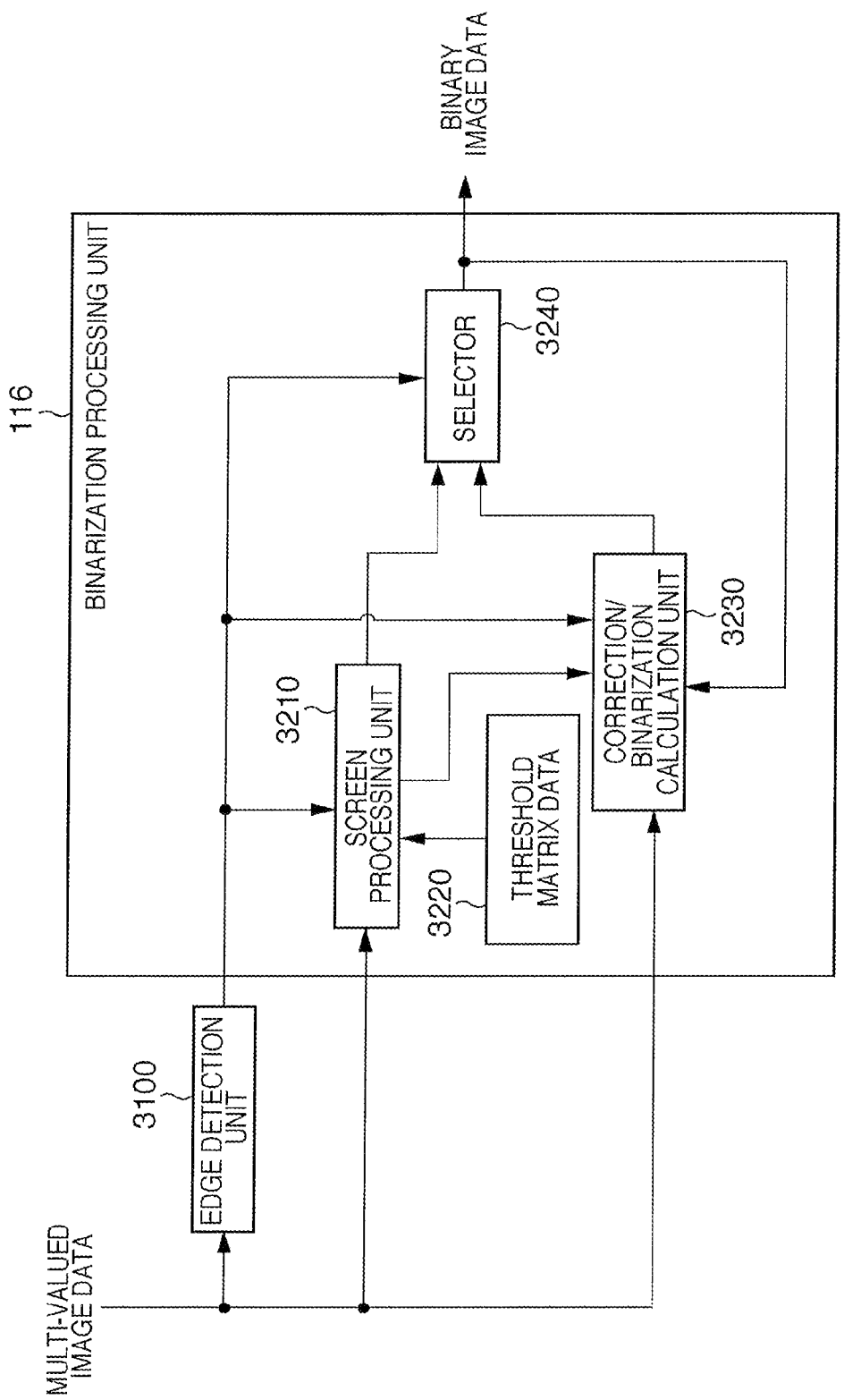
FIG. 3 is a block diagram showing the arrangements of a binarization processing unit and its periphery in the first embodiment.

FIG. 3 is a block diagram showing the block arrangement of the binarization processing unit 116 serving as a feature of the first embodiment, and also showing the connection between the edge detection unit 3100 and binarization processing unit 116.

Assume that image data of color components of interest from the UCR•output masking unit 115 are input in the raster scan order. The binarization processing unit 116 processes pixel data (8 bits) input in the raster scan order for each pixel.

The edge detection unit 3100 detects the edge amount of a pixel of interest, and determines whether the pixel of interest is a pixel at an edge position (to be referred to as an edge pixel hereinafter) or a pixel at a non-edge position (to be referred to as a non-edge pixel hereinafter). The edge detection unit 3100 outputs the determination result as an edge determination signal to a screen processing unit 3210, correction/binarization calculation unit 3230, and selector 3240.

When the edge detection result output from the edge detection unit 3100 represents a non-edge pixel, the screen processing unit 3210 uses a predetermined threshold matrix 3220 to generate binary image data from pixel data of interest and output the binary image data. In the first embodiment, the scanning exposure range of one pixel is divided into four. Thus, the screen processing unit 3210 generates and outputs data of a total of 4 bits each representing whether or not to expose each divided area. The correspondence between each of four bits and "1" (to expose) or "0" (not to expose) depends on input multi-valued pixel data and the threshold matrix.

When the edge detection result output from the edge detection unit 3100 represents an edge pixel, the correction/binarization calculation unit 3230 performs correction calculation (to be described later) for pixel data of interest, and outputs binary image data (4 bits similar to data output from the screen processing unit 3210).

The selector 3240 selects and outputs binary image data from the screen processing unit 3210 when the edge detection result output from the edge detection unit 3100 represents a non-edge pixel, and binary image data from the correction/binarization calculation unit 3230 when the edge detection result represents an edge pixel.

More specifically, the binarization processing unit 116 in the first embodiment selects and outputs either of two binarization processing results depending on whether pixel data of interest represents an edge or non-edge pixel.

FIG. 5 shows input multi-valued image data (3×3 pixel values centered on a pixel A of interest) and an edge detection filter (size of 3×3 pixels) used in the edge detection unit 3100. A value E is calculated by the product-sum operation of neighboring pixels and the edge detection filter. The calculated value E is compared with a preset edge determination threshold TE. If E≥TE, it is determined that the pixel of interest is an edge pixel. If E<TE, it is determined that the pixel of interest is a non-edge pixel. Note that the pixel area to be referred to and the filter have a size of 3×3 pixels in FIG. 5, but the present invention is not limited to this size. Also, the coefficient values of the edge detection filter are not limited to those shown in FIG. 5. The embodiment adopts a linear filter shown in FIG. 5 as an edge detection method, but an edge may also be detected by another method using, e.g., a Sobel filter. The edge determination threshold is not limited to a fixed value. The edge determination threshold may also be held as LUT (Look Up Table) data and set as a variable value in accordance with pixel data of interest or the like, or may also be defined as a function.

Figure 4:
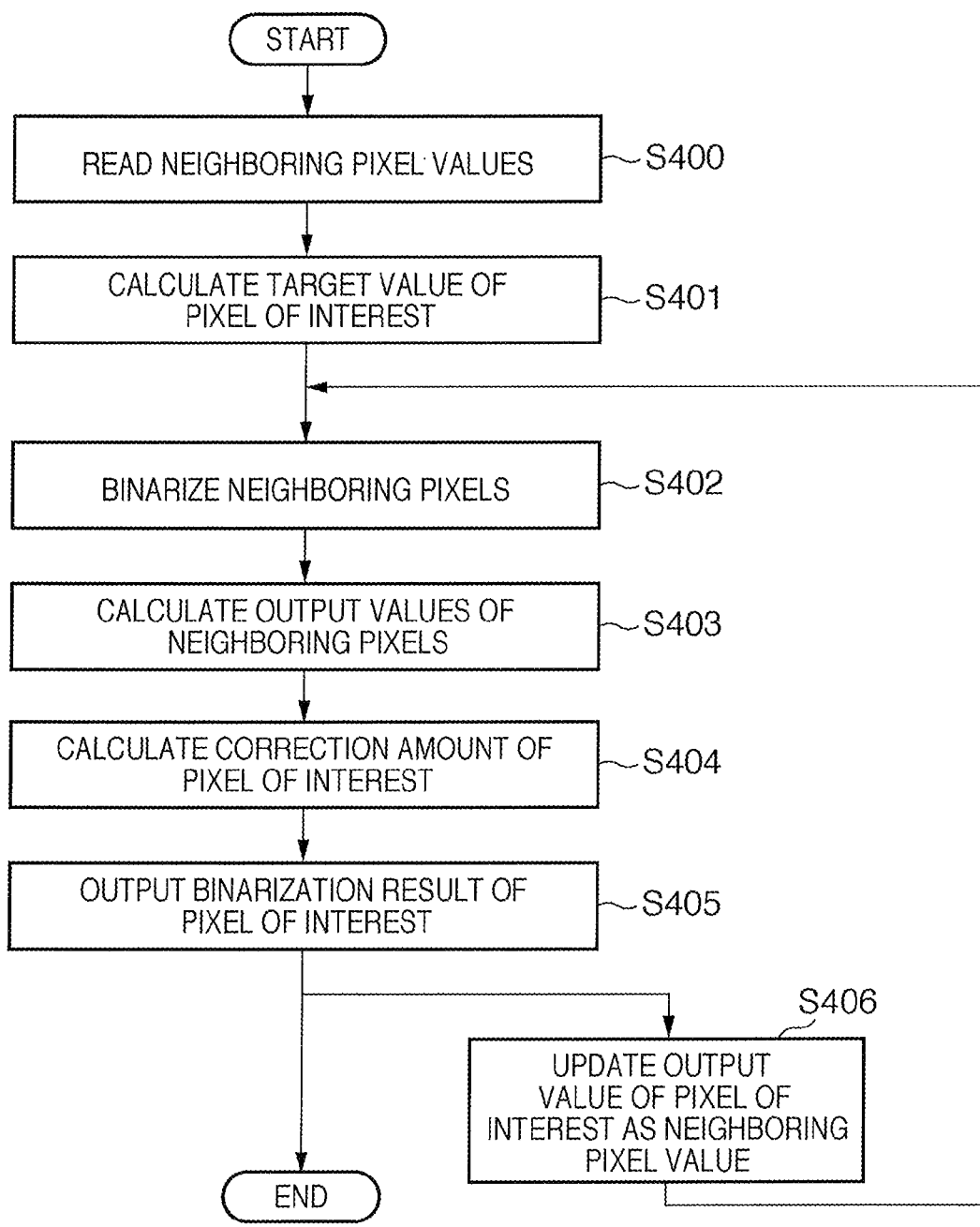
FIG. 4 is a flowchart showing the processing contents of a correction/binarization calculation unit in the first embodiment.

The processing contents of the correction/binarization calculation unit 3230 when the edge detection unit 3100 determines that pixel data of interest represents an edge pixel will be explained with reference to the flowchart of FIG. 4. Similar to FIG. 5, "A" represents the value of a multi-valued pixel of interest.

The correction/binarization calculation unit 3230 reads the pixel value A of interest and neighboring pixel values from input multi-valued image data (step S400).

Then, the correction/binarization calculation unit 3230 calculates a target value A' of pixel of interest (step S401).

Figure 6A:
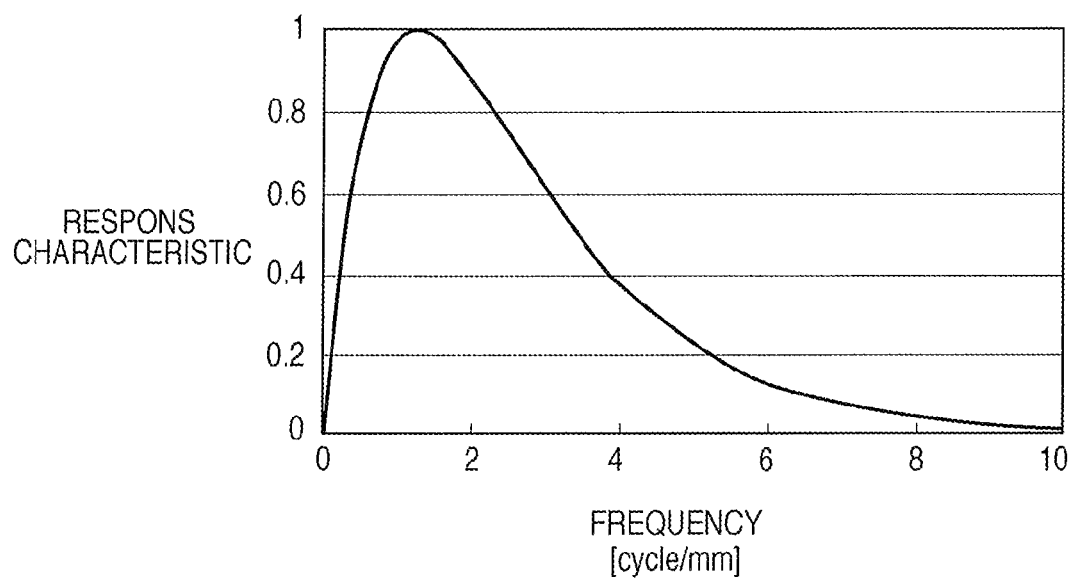
FIGS. 6A and 6B are graphs showing filter characteristics used in the correction/binarization calculation unit in the embodiment.

The target value A' is obtained by filtering processing, i.e., the product-sum operation of image data and filter coefficients using image data of a 11×11 pixel area centered on the pixel A of interest and a visual sense characteristic filter (size of 11×11). FIG. 6A shows an example of the frequency characteristic of the visual sense characteristic filter (first filter) used to calculate the target value A'. In FIG. 6A, the abscissa axis represents the frequency, and the ordinate axis represents the frequency response value of the human eye.

Then, the correction/binarization calculation unit 3230 binarizes the pixel of interest and its neighboring pixels (step S402). Similar to the above-described method of binarizing a non-edge pixel, the correction/binarization calculation unit 3230 binarizes the pixel of interest and its neighboring pixels by comparison using the threshold matrix 3220.

The correction/binarization calculation unit 3230 calculates output values B' of the neighboring pixels (step S403).

Figure 6B:
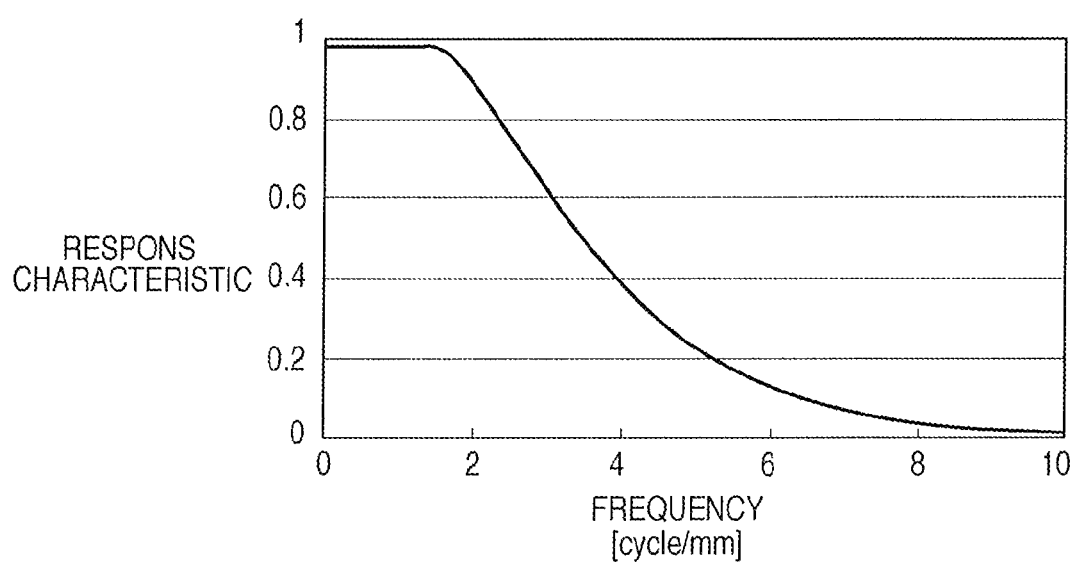

The output values B' of the neighboring pixels are calculated by the product-sum operation of binary data (including binary data B of the pixel of interest) of neighboring pixels in the 11×11 pixel area centered on the pixel of interest, and a filter obtained by combining two, engine and visual sense characteristics of the image processing apparatus. Note that binary data represents the number of "1"s in font areas corresponding to one pixel. FIG. 6B shows an example of the frequency characteristic of a filter (second filter) obtained by combining two, engine and visual sense characteristics of the image processing apparatus. Similar to FIG. 6A, the abscissa axis represents the frequency, and the ordinate axis represents the frequency response value of the human eye. As shown in FIG. 6B, the ordinate axis for the filter shows a real number whose maximum value is "1", so the value B' includes a decimal part.

Next, the correction/binarization calculation unit 3230 calculates a correction amount C' of the pixel of interest (step S404). The correction amount C' is calculated by $$C'=A'-B'$$

The correction/binarization calculation unit 3230 outputs, as a binarization result D of the pixel of interest, the result of adding the correction amount C' to the binarization result B of the pixel A of interest (S405). The binarization result D of the pixel of interest is calculated by $$D=B+C'$$

Assume that the binarization result B of the pixel of interest is binarized on the premise that one of four areas is scanned and exposed, and the correction amount C' is "1.1". In this case, B=1+1.1=2.1. The result of rounding down or off the decimal part is determined as the output value D of the pixel of interest. In this case, the output value D is determined on the premise that two of the four areas of the pixel of interest are exposed.

By adding the correction amount C' to the binary value B of the pixel A of interest in this fashion, the value of the pixel A of interest comes close to the target value A'. As a result, a jaggy or disconnection of an edge portion becomes visually less conspicuous.

Finally, the correction/binarization calculation unit 3230 updates the output value of the pixel of interest (step S406). Multi-valued image data are sequentially input in the main scanning direction and sub-scanning direction. A given band area (11×11 pixels around the pixel of interest in the first embodiment) is read to process pixels of interest one by one. The correction/binarization calculation unit 3230 refers to the input values and binarization results of 11×11 neighboring pixels centered on the pixel of interest. If a plurality of edge pixels exist among neighboring pixels, the value changes between a case where the neighboring pixel is processed as an edge pixel and a case where the neighboring pixel is processed as a non-edge pixel, failing to accurately calculate the output value B' of the neighboring pixel. To prevent this, the output value of the pixel of interest corrected in step S406 is updated. Accordingly, correction processing can be accurately performed for the next edge pixel even when a plurality of edge pixels exist among 11×11 neighboring pixels.

As described above, the selector 3240 outputs binary image data upon switching the contents of binarization processing depending on whether the pixel data of interest represents an edge or non-edge pixel. The output value of an edge pixel is corrected in consideration of the visual sense characteristic and the engine characteristic of the image processing apparatus, obtaining a high-quality output image in which a jaggy or a disconnection of a thin line hardly stands out.

The range of neighboring pixels referred to by the correction/binarization calculation unit is 11×11 pixels in the first embodiment, but is not limited to this size.

Second Embodiment

In the first embodiment, binary image data is output upon switching the contents of binarization processing depending on whether the pixel of interest is an edge or non-edge pixel in an image processing method and apparatus for performing screen processing for halftone image data and binarizing the data. More specifically, when the pixel of interest is a non-edge pixel, binarization is done by screen processing. When the pixel of interest is an edge pixel, binarization is done by executing edge correction processing by the above-described correction/binarization calculation unit.

However, edge correction processing by the correction/binarization calculation unit refers to a corrected output value, so a memory for storing the output value is necessary. When implementing a hardware arrangement, a smaller memory capacity is desirable. Generation of a jaggy and a disconnection of a thin line at the edge portion of image data having Undergone screen processing also need to be prevented.

The second embodiment will implement a hardware arrangement with a small memory capacity while preventing generation of a jaggy and a disconnection of a thin line at the edge of image data obtained by performing screen processing for halftone image data.

FIG. 7 is a block diagram showing a method of binarization processing as a feature of the second embodiment in the above-described image processing apparatus.

In the arrangement of FIG. 7, the same reference numerals as those of the first embodiment in FIG. 2 denote the same parts, and a detailed description thereof will not be repeated.

The arrangement of FIG. 7 is different from that of FIG. 2 in that the system which feeds back binary image data output from a selector 3240 to a correction/binarization calculation unit 3230 is omitted, and a thin line detection unit 6300 and PWM processing unit 6250 (both of which will be described later) are added.

That is, the above-mentioned system which feeds back binary image data serving as an output result is omitted to obviate the need for a memory for storing an output value. The hardware arrangement can be implemented with a small memory capacity. By switching the contents of binarization processing in accordance with the results of the edge detection unit and thin line detection unit, generation of a jaggy and a disconnection of a thin line at the edge portion of image data having undergone screen processing can be prevented.

The second embodiment will be described in detail below.

The PWM processing unit 6250 outputs binary image data (1×4 bits) simply from the value of the pixel of interest for input pixel data of interest without referring to neighboring pixels.

According to the PWM conversion method, input multi-valued digital data is temporarily converted into a voltage fluctuation signal by D/A conversion. The voltage level of the converted signal is compared with that of a reference wave in the same period as the input period of the input data. A light-emitting element is turned on if the converted signal is larger, and turned off if it is smaller. According to this method, the size of a pixel in the main scanning direction and the dot formation position can be controlled by switching the reference wave to be compared in accordance with an image processing control signal.

Figure 8:
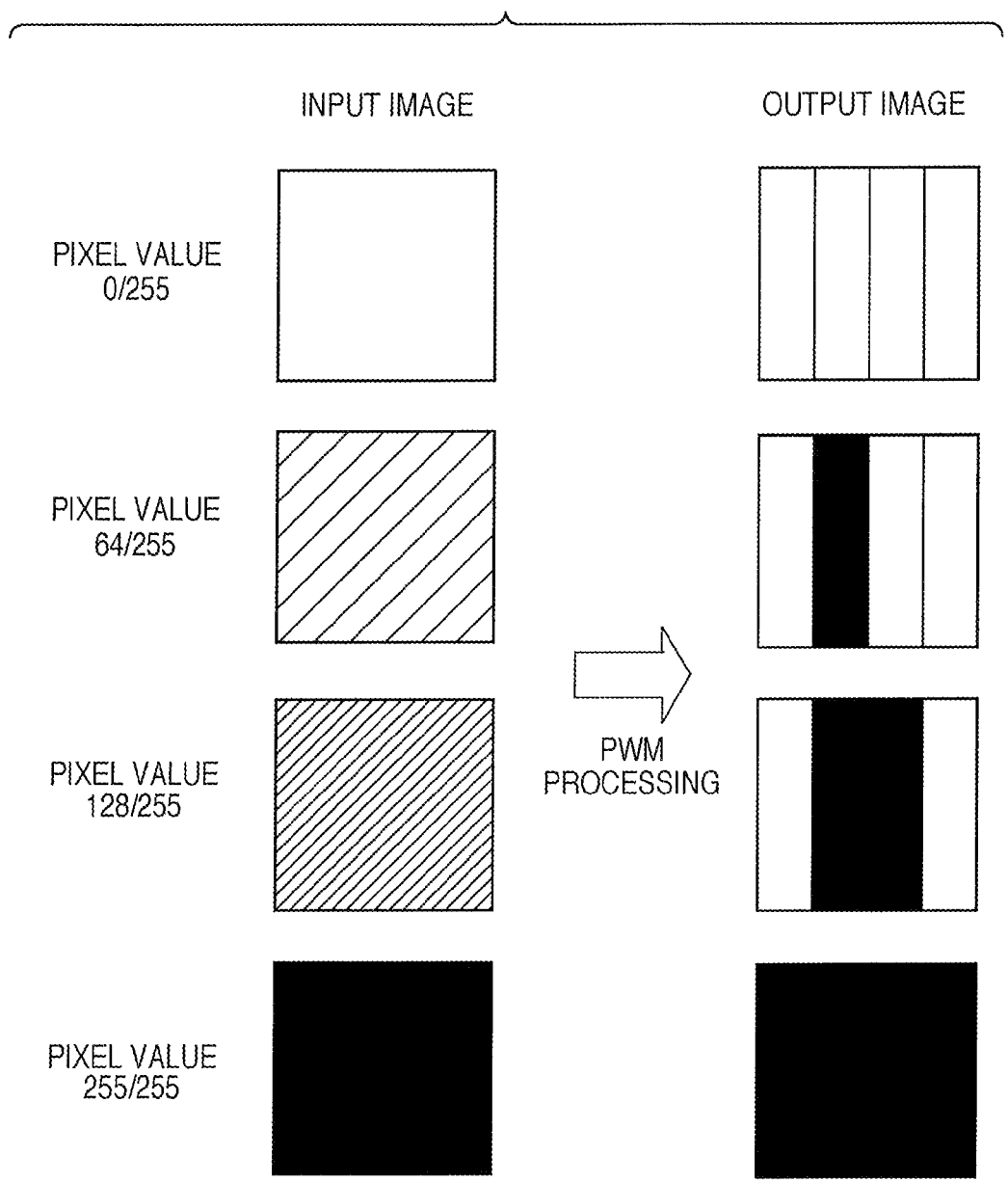
FIG. 8 is a view showing the relationship between input and output images in PWM processing.
Figure 13A:
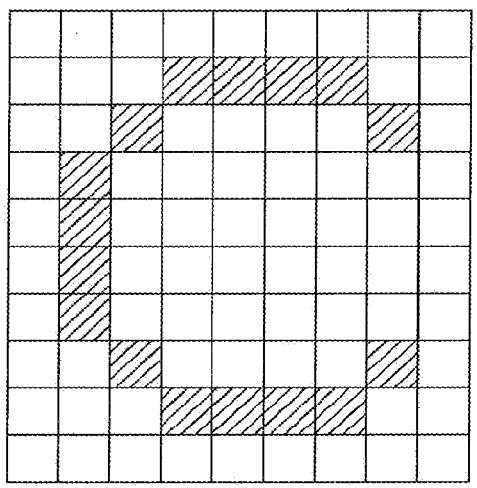
FIGS. 13A and 13B are views each showing an example of performing conventional screen processing for halftone image data.
Figure 13B:
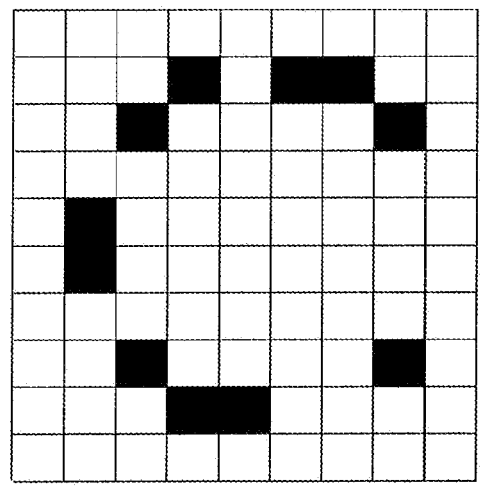
Figure 14:
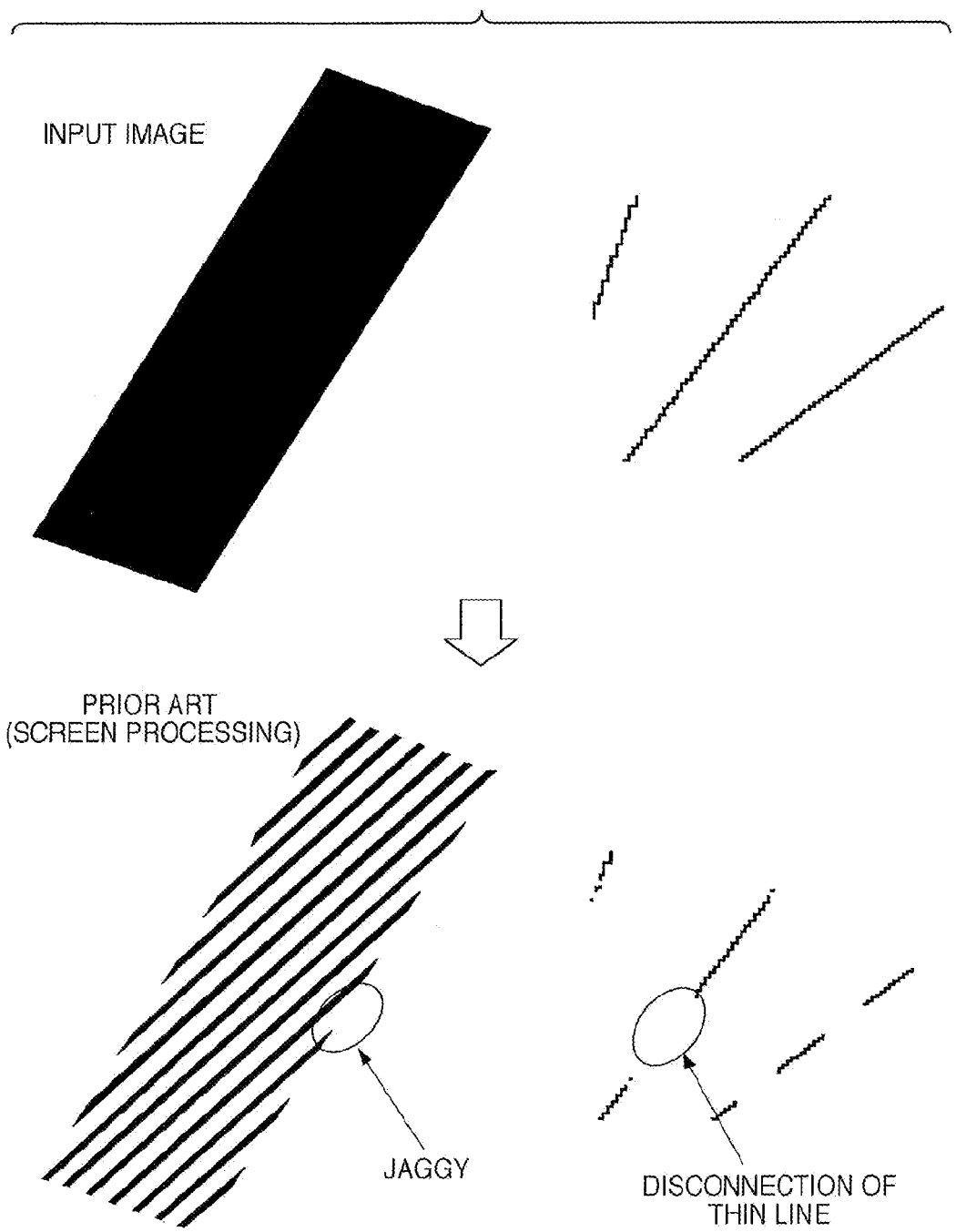
FIG. 14 is a view showing a jaggy generated by conventional screen processing.

FIG. 8 shows an example of the relationship between concrete input and output images in PWM processing. In the example of FIG. 8, an area represented by one dot is divided into four to represent the density by five levels of 0 to 4.

The thin line detection unit 6300 detects whether input multi-valued image data represents a thin line. In this case, the thin line means image data of a thin line which is two or less dots wide.

FIGS. 9A and 93 show examples of a linear filter used in the thin line detection unit 6300. Similar to the edge detection unit 3100 in the first embodiment, the product-sum operation of input multi-valued image data and the linear filter is executed. The calculated value is compared with a thin line determination threshold to determine whether the pixel of interest is a thin line or non-thin line pixel. FIG. 9A shows a thin line detection filter in the vertical direction, and FIG. 9B shows a thin line detection filter in the horizontal direction.

The second embodiment has described two linear filters shown in FIGS. 9A and 9B as a thin line detection method. However, a thin line may also be detected by another method. In thin line determination, the result of the product-sum operation of input image data and the linear filter may also be normalized. The thin line determination threshold is not limited to a fixed value. The thin line determination threshold may also be held as LUT data and set as a variable value in accordance with pixel data of interest, or may also be defined as a function.

The sequence of processing in FIG. 7 will be explained.

An edge detection unit 3100 determines whether the pixel of interest in input multi-valued image data is an edge or non-edge pixel.

Then, the thin line detection unit 6300 determines whether the pixel of interest in the input multi-valued image data is a thin line or non-thin line pixel.

More specifically, in the second embodiment, binarization processing for the pixel of interest is switched in accordance with the edge detection result and thin line detection result. When the pixel of interest is a non-edge pixel and non-thin line pixel, a screen processing unit 3210 executes binarization processing. When the pixel of interest is an edge pixel and non-thin line pixel, a correction/binarization calculation unit 3230 executes binarization processing. When the pixel of interest is an edge pixel and thin line pixel, the PWM processing unit 6250 executes binarization processing.

FIG. 10 is a table showing at once binarization processing contents corresponding to edge determination results and thin line determination results.

Figure 15:
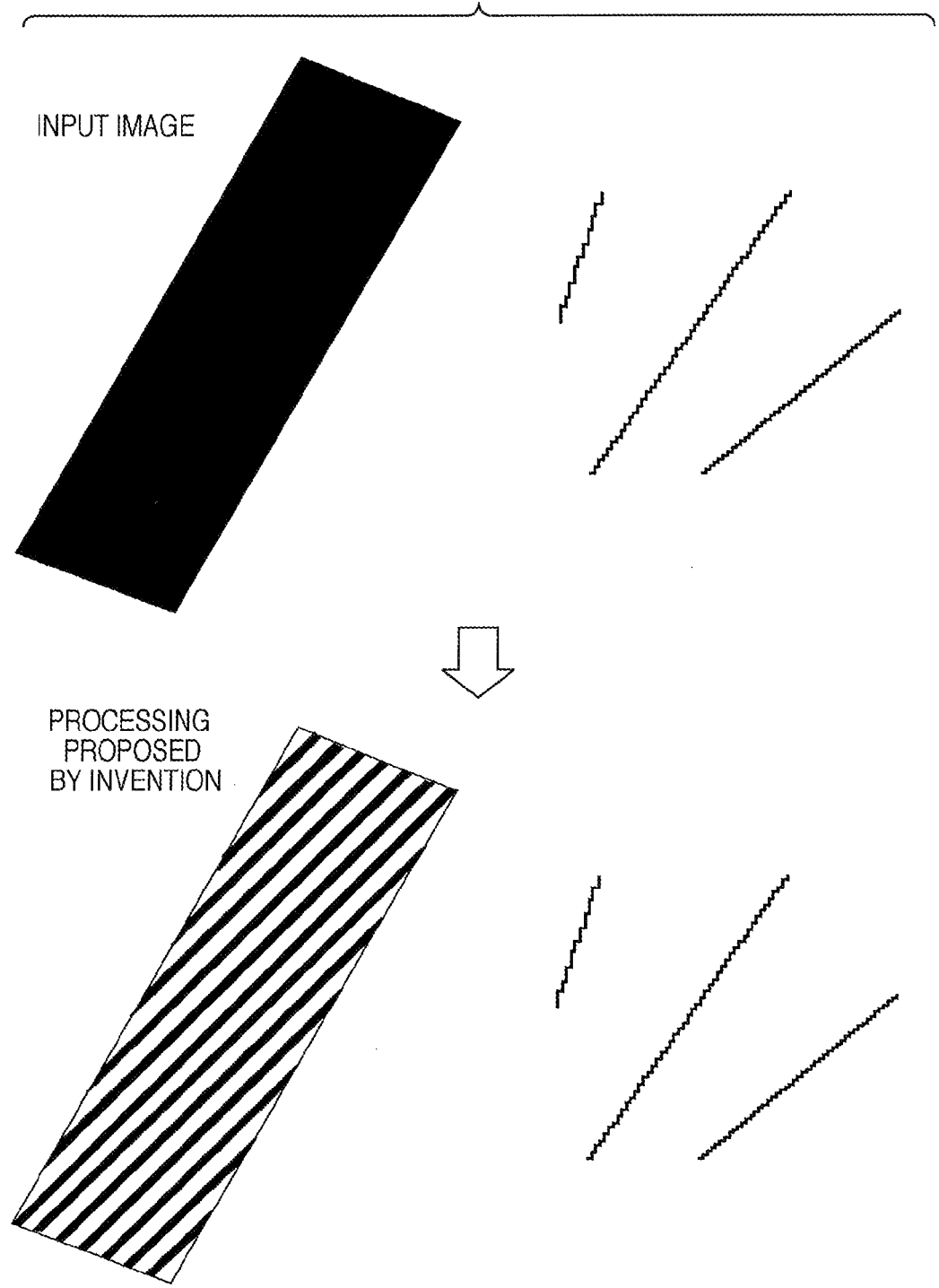
FIG. 15 is a view showing an improvement of a jaggy generated in processing in the embodiment.

FIG. 15 shows binary image data output in the first and second embodiments. The edge portion of an image is corrected.

In this manner, generation of a jaggy and a disconnection of a thin line at the edge portion of image data having undergone screen processing can be prevented by switching binarization processing contents in accordance with the results of the edge detection unit and thin line detection unit. Since the system used in the first embodiment to feed back binary image data serving as an output result is omitted, the memory for storing an output value becomes unnecessary, and the hardware arrangement can be implemented with a small memory capacity.

In the second embodiment, binary data is generated by performing PWM processing when the pixel of interest is a thin line pixel. However, the same effects can also be obtained by generating binary data by screen processing using a high-LPI screen.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-269528, filed Oct. 16, 2007, which is hereby incorporated by reference herein in its entirety.

What is claimed is:

1. An image processing apparatus comprising:
   a screen processing unit which performs, using a threshold matrix, a screen processing for inputted image data;
   a correction unit which calculates a correction amount related to a pixel of interest within the inputted image data in accordance with a difference between a target value calculated based on pixel values of each pixels included in an area centered on the pixel of interest within the inputted image data and an output state value calculated based on the pixel values of each pixels included in a corresponding area centered on the pixel of interest within data obtained by said screen processing unit and corrects a value of the pixel of interest obtained by the screen processing unit using the calculated correction amount so that the output state value of pixel of interest comes close to the target value.

2. The apparatus according to claim 1, wherein the target value taken from the area centered on the pixel of interest within the inputted image data is obtained by performing a filter processing for the inputting image data using a first filter.

3. The apparatus according to claim 2, wherein the values taken from the area centered on the pixel of interest within data obtained by said screen processed unit is obtained by performing a filtering processing using a second filter for the data obtained by said screen processing unit.

4. The apparatus according to claim 2, wherein said first filter is a filter comprising a visual sense characteristic.

5. The apparatus according to claim 3, wherein the apparatus converts the inputted image data into tone data reproducible by a printer engine,
   wherein said second filter is a filter corresponding to an engine characteristic of the printer engine.

6. The apparatus according to claim 1, wherein said correction unit corrects data obtained by said screen processing unit.

7. The apparatus according to claim 1, wherein the correction unit adds the correction amount to the pixel of interest in the data obtained by performing the screen processing unit for the inputted image data, where the correction amount is obtained by subtracting the value taken from the area centered on the pixel of interest obtained by said screen processing unit from the target value taken from the area centered on the pixel of interest within the inputted image data.

8. The apparatus according to claim 1, wherein the values taken from the areas neighboring the area of interest obtained by said screen processing unit directly neighbor the target value taken from the area of interest within the inputted image data.

9. The apparatus according to claim 1, further comprising a detection unit which detects an edge pixel using an edge detection filter,
  wherein the correction unit calculates the correction amount of a pixel, as the pixel of interest, on the edge pixels detected by the detection unit.

10. The apparatus according to claim 1, wherein the correction unit comprises:
  a first calculation unit which calculates the target value using the product-sum operation of pixel values of each pixels included in the area centered on the pixel of interest within the inputted image data and predetermined filter coefficients; and
  a second calculation unit which calculates the output state value using the product-sum of pixel values of each pixels included in the corresponding area centered on the pixel of interest within data obtained by the screen processing unit,
  wherein correction unit calculates the correction amount related to a pixel of interest within the inputted image data in accordance with a difference between the target value and the output state value.

11. The apparatus according to claim 1, wherein the screen processing unit binarizes the inputted image data.

12. The apparatus according to claim 1, wherein the correction unit adds the calculated correction amount to the value of the pixel of the pixel of interest.

13. The apparatus according to claim 1, wherein the correction unit calculates the target value by a product-sum operation of pixel values of each pixels included in the area within the inputted image data, and the output state value by a product-sum operation of pixels values of each pixels include in the corresponding area within data obtained by said screen processing unit.

14. The apparatus according to claim 13, wherein the correction unit calculates the between the target value and the output state value as the correction amount.

15. A method of controlling an image processing apparatus, the method comprising:
  a screen processing step of performing, using a threshold matrix, a screen processing for inputted image data;
  a correction step of calculating a correction amount related to a pixel of interest within the inputted image data in accordance with a difference between a target value calculated based on pixel values of each pixels included in an area centered on the pixel of interest within the inputted image data and an output state value calculated based on the pixel values of each pixels included in a corresponding area centered on the pixel of interest within data obtained in said screen processing step and correcting a value of the pixel of interest obtained in the screen processing step using the calculated correction amount so that the output state value of pixel of interest comes close to the target value.

16. The method according to claim 15, wherein the values taken from the areas neighboring the area of interest obtained by said screen processing unit directly neighbor the target value taken from the area of interest within the inputted image data.

17. A non-transitory computer-readable storage medium storing a computer program that causes a computer executing the program to perform a method comprising:
  a screen processing step of performing, using a threshold matrix, a screen processing for inputted image data;
  a correction step of calculating a correction amount related to a pixel of interest within the inputted image data in accordance with a difference between a target value calculated based on pixel values of each pixels included in an area centered on the pixel of interest within the inputted image data and an output state value calculated based on the pixel values of each pixels included in a corresponding area centered on the pixel of interest within data obtained in said screen processing step and correcting a value of the pixel of interest obtained in the screen processing step using the calculated correction amount so that the output state value of pixel of interest comes close to the target value.

\* \* \* \* \*